US012256857B2

(12) United States Patent
Murry

(10) Patent No.: US 12,256,857 B2
(45) Date of Patent: Mar. 25, 2025

(54) ADVANCED INTELLIGENT FLUID BOTTLE APPARATUS, METHOD, AND SYSTEM

(71) Applicant: William Jordyn, LLC., Chesapeake, VA (US)

(72) Inventor: Derrick William Murry, Portsmouth, VA (US)

(73) Assignee: William Jordyn, LLC, Portsmouth, VA (US)

( * ) Notice: Subject to any disclaimer, the term of this patent is extended or adjusted under 35 U.S.C. 154(b) by 41 days.

(21) Appl. No.: 17/902,988

(22) Filed: Sep. 5, 2022

(65) Prior Publication Data

US 2023/0075960 A1    Mar. 9, 2023

Related U.S. Application Data

(60) Provisional application No. 63/242,409, filed on Sep. 9, 2021.

(51) Int. Cl.
| *A47G 23/16* | (2006.01) |
| *A47G 19/22* | (2006.01) |
| *G08B 21/18* | (2006.01) |
| *G10L 15/22* | (2006.01) |

(52) U.S. Cl.
CPC ......... *A47G 23/16* (2013.01); *A47G 19/2227* (2013.01); *A47G 19/2288* (2013.01); *G08B 21/182* (2013.01); *A47G 2019/2238* (2013.01); *A47G 2200/226* (2013.01); *G10L 15/22* (2013.01)

(58) Field of Classification Search
CPC ................ A47G 23/16; A47G 19/2227; A47G 19/2288; A47G 2019/2238; A47G 2200/226; G08B 21/182; G10L 15/22
USPC ....................................................... 340/612
See application file for complete search history.

(56) References Cited

U.S. PATENT DOCUMENTS

| 5,208,896 A * | 5/1993 | Katayev ............... H05B 1/0269 |
| | | 219/521 |
| 10,329,061 B2 * | 6/2019 | Dias ..................... B65D 51/245 |
| 11,311,129 B1 * | 4/2022 | Chen .................. A47G 19/2227 |
| 2006/0261233 A1 * | 11/2006 | Williams ........... A47G 19/2227 |
| | | 248/311.2 |

(Continued)

*Primary Examiner* — Zhen Y Wu
(74) *Attorney, Agent, or Firm* — Forward Entertainment & Technology, LLC; James Clarke; Chiedo Ohanyerenwa

(57) ABSTRACT

The disclosure relates to the first seriously smart water bottle. The bottle is designed to provide an easier, more accurate approach to tracking and loggings one's water/fluid intake with minimal effort from the user. Mass utilization of this environmental-friendly hydration tool will also serve as a catalyst for the promotion of environmental consciousness and add value by helping push the conversation forward about global environmental protection. Variations of this mechanism will grant anyone, with a smart device, the ability to monitor the amount of water/fluid consumption, not only for themselves, but also for anyone else they care for, from infants to senior citizens. The device will operate in conjunction with its namesakes' software application. Regardless of gender, age, height, weight, health condition, or activity level this tool will undoubtedly aid the user in leading a healthier, more productive lifestyle and in some cases, be essential to the preservation of life.

13 Claims, 10 Drawing Sheets

(56) References Cited

U.S. PATENT DOCUMENTS

| | | | |
|---|---|---|---|
| 2007/0279905 A1* | 12/2007 | Chan | A47G 19/2227 |
| | | | 362/253 |
| 2013/0200064 A1* | 8/2013 | Alexander | A47J 36/2466 |
| | | | 219/441 |
| 2013/0319915 A1* | 12/2013 | Gellibolian | C02F 1/002 |
| | | | 210/87 |
| 2015/0122688 A1* | 5/2015 | Dias | A47G 19/027 |
| | | | 206/459.1 |
| 2015/0182797 A1* | 7/2015 | Wernow | G16H 20/30 |
| | | | 482/8 |
| 2015/0334079 A1* | 11/2015 | Laidlaw | H04L 67/12 |
| | | | 704/235 |
| 2016/0286993 A1* | 10/2016 | Pau | A47G 19/2288 |
| 2017/0176238 A1* | 6/2017 | Dubey | G01G 17/06 |
| 2017/0238744 A1* | 8/2017 | Sweeney | G01F 13/006 |
| 2017/0273488 A1* | 9/2017 | Lonis | A47G 23/16 |
| 2019/0021529 A1* | 1/2019 | Schucker | G01F 23/20 |
| 2020/0375384 A1* | 12/2020 | Beckman | A47G 9/10 |
| 2021/0068567 A1* | 3/2021 | Ganter, I | F21V 23/0414 |
| 2021/0321803 A1* | 10/2021 | Zimbelman | A47G 23/16 |
| 2022/0218137 A1* | 7/2022 | Iverson | G01G 23/365 |
| 2022/0257035 A1* | 8/2022 | Elsokary | G08B 21/182 |

* cited by examiner

ADVANCED INTELLIGENT FLUID BOTTLE APPARATUS, METHOD, AND SYSTEM

CROSS-REFERENCE TO RELATED APPLICATIONS

The present application claims priority to U.S. Provisional Patent Application No. 63/242,409, filed Sep. 9, 2021. The entire disclosure of U.S. Provisional Patent Application No. 63/242,409—is incorporated herein by reference.

TECHNICAL FIELD

The general field of the disclosure herein relates to intelligent fluid bottle apparatuses, methods and systems, and more particularly to fluid bottle apparatuses, methods and systems that provide for the intelligent transport, measuring and monitoring of fluids to suit the needs of individual users.

BACKGROUND

It is an overall accepted fact that mankind needs water to survive. But exactly how much water is needed for us to thrive? Water makes up 50-70% of the human body weight. It keeps the body temperature normal, lubricates and cushions joints, and protects sensitive tissues. Everyday water is loss through breathing, perspiration, urine, and bowel movements. For the body to function properly, it is a must for one to replenish its water supply. For many years, general information has been dispensed on how much water we should drink daily. One major issue with that is this information is based on statistics derived from studies wherein the focus groups consisted of the same variables: relatively healthy, active adults. What about those who are not in that category? Should we all be held to the same hydration standard?

According to the Guidelines for Drinking Water Report (2004), by the World Health Organization, "Given the extreme variability in water needs which are not solely based on differences in metabolism, but also in environmental conditions and activity, there is not a single level of water intake that would ensure adequate hydration and optimal health for half of all apparently healthy persons in all environmental conditions." In other words, we are all different ages, heights, weights, have different health condition, various activity levels, and reside in different climates. And because of these apparent factors, a closer look should be taken at how we hydrate per our individual, personal needs, and the importance thereof. Not drinking enough water puts one at risk of dehydration, kidney stones, and poorer cognitive performance. While drinking too much water will create an inability of the kidneys to get rid of the excess water causing the sodium content of the blood to become diluted. This is called Hyponatremia and can be life-threatening. That is why this smart hydration tool seeks to replenish the body's water supply accurately and effectively by targeting the specific hydration needs of the user based upon user-provided personal information variables, to provide a much narrower range of hydration goals to be met, ultimately, with the goal in mind of the user operating and functioning at their optimal best.

When asked, most cannot provide an accurate depiction of how much water they consume daily. They have no clue if they are drinking too much water or too little. In the same way many track their exercise output, the user can now confidently and assuredly track their water intake, thanks to the one-of-a-kind, state-of-the-art hydration tool set forth in this disclosure. Other features of this disclosure include embodiments can help people track what type of water they were drinking. Was it acidic, did it have high pH, was it salty indicating the presence of electrolytes, were nitrates and nitrites present, what temperature was the fluid?

Some features may include the data about the fluid or its consumption being displayed on the bottle, others may go to a database and be fed into an app. From here the utility of such a device could be immense. It could be used to tell parents if their baby is drinking enough milk, people watering plants or filling an aquarium if the temperature is set right for their plants or pets, it could display an alarm if the presence of lead, alcohol or other undesired substances is detected and warn the user to decontaminate the bottle.

Another novel aspect of this invention is the response system some such embodiments. In some exemplary embodiments it may respond to a mechanism, including but not limited to a PH probe, a Dissolved Oxygen Probe, or a sensor that detects the presence of one or more impurities and sends a signal to activate the impurity remover. In some preferred embodiments of the present disclosure the invention exploits physical principles to create an electromagnetic field, Ultraviolet field, continuous cycle filter. In some exemplary embodiments the present disclosure may be an apparatus bottle, the fluid may be water, the impurity detected may be copper and the impurity detection mechanism may be the user's own line of site. In some such exemplary embodiments the user may see copper in the water or the pH strips lining the water bottle and press a button to activate an electric fan or mixer in the filtering section of the bottle. The electric fan or mixer would then act as an impeller to push the impure water in a continuous cycle as the heavy impurities are pushed to the edge of the bottle due to centripetal force. The edge of the jar may be lined with filters which capture the impurities as the water can be safely consumed. In certain preferred embodiments, such a device may be imbedded into varied systems including but not limited to a portable water bottle which may collect city water detecting the presence of lead, a portable cup apparatus where microbiological organisms may be present, or a method for feeding plants where beneficial nutrients are kept with the water while harmful ones are removed based on the speed of rotation.

These and other objectives can be achieved by a water bottle apparatus, method and system of the present disclosure

SUMMARY OF THE INVENTION

The disclosure relates to the first ever smart water bottle. The bottle is designed to provide an easier, more accurate approach to tracking and loggings one's water/fluid intake with minimal effort from the user. Mass utilization of this environmental-friendly hydration tool will also serve as a catalyst for the promotion of environmental consciousness and add value by helping push the conversation forward about global environmental protection. Variations of this mechanism will grant anyone, with a smart device, the ability to monitor the amount of water/fluid consumption, not only for themselves, but also for anyone else, from infants to senior citizens. In some preferred embodiments a bottle operates in conjunction with a software application as part of a system. In some such embodiments the application is the location where all intake information will be tracked, logged, and stored for personal use or monitoring of infants/ children by parents/guardians, or patients by medical professionals.

In some embodiments, information related to the type of fluid or fluids consumed can be tracked and presented, in some such embodiments with measurements beyond the quantity of fluid consumed, including but not limited to detected pH, temperature, speed of consumption, time of consumption, dissolved oxygen content, alcoholic content, or data input directly by the user. In some embodiments the data related to consumption may be displayed directly on the bottle. In some such embodiments this data may be digitally displayed. In other such embodiments this data may be displayed in analogue form via means including but not limited to a sight glass, magnetic level indicator or thermometer. In other embodiments data related to consumption may be transmitted to a database and/or displayed on a computer or mobile application.

In yet other embodiments the bottle may have a number of transport and consumption features including but not limited to the ability to block consumption at a preset or user set limit, the ability to display an indicator light when a goal has been reached, the ability to display an indicator light when a particular harmful chemical has been measured over an acceptable predefined or user defined threshold, or the ability to attach and detach from one or more intelligent bases. In some such embodiments these intelligent bases include any number of electrically powered functions, including but not limited to comprising a solar panel to recharge an internal battery, comprising a mixer or blender that can be used to cut or blend solids or slurry particulates, comprising one or more LEDs which respond to signals from the system, a digital display, an analogue display or counter that displays data including but not limited to the quantity of fluid consumed, the amount of fluid in the bottle, the weight of the fluid, the number of times the bottle has been turned upside-down or a value input by the user.

Some embodiments of the disclosure may relate to the interoperability of the base with the bottle. In some embodiments, such as those where the base acts as a mixer or blender for the bottle it may be necessary to join the base and the bottle to retain fluid. In other embodiments the connection of the base to the bottle may result in the opening of an orifice in which additional fluid or mixture material already is or can be stored. In yet other embodiments the joinder of the closed bottom of the bottle with the base may result in activating any number of functions including but not limited to: the completion of a magnet such that when joined the bottle can cling to metal objects so that it stays in one place during high speed travel or for use in zero-gravity; the completion of a circuit so that a rechargeable battery housed within the base functions to drive one or more of the aforementioned electrically powered functions from the preceding paragraph; creating a relay allowing the bottle to transmit or receive communications wirelessly; or any combination herein. Some such embodiments may include the software application along with controls directly on the face of the bottle itself with memory either stored therein or communicated to and from an external database. In some such embodiments the face of the bottle may serve as a display. In other such embodiments there may be an attachment to the face attached and removed by mechanisms including but not limited to magnetism, mechanical latches or electronic connection (some such embodiments including circuitry on the face of the bottle which connects to circuitry on the backside of a digital display, which may be given added utility by adding features including but not limited to color, ergonomic grip support or any combination therein). In some such embodiments the features of the interchangeable faces may be interchangeable as well.

While the preferred embodiments of the disclosure are shown in the accompanying drawings, it to be understood that said embodiments are susceptible to modification and alteration while still maintaining the spirit of my invention.

BRIEF DESCRIPTION OF THE DRAWINGS

Referring to the drawings.

Referring to the drawings.

Referring to the drawings.

Referring to the drawings.

Referring to the drawings.

Referring to the drawings.

Referring to the drawings.

DETAILED DESCRIPTION

Figure 1:
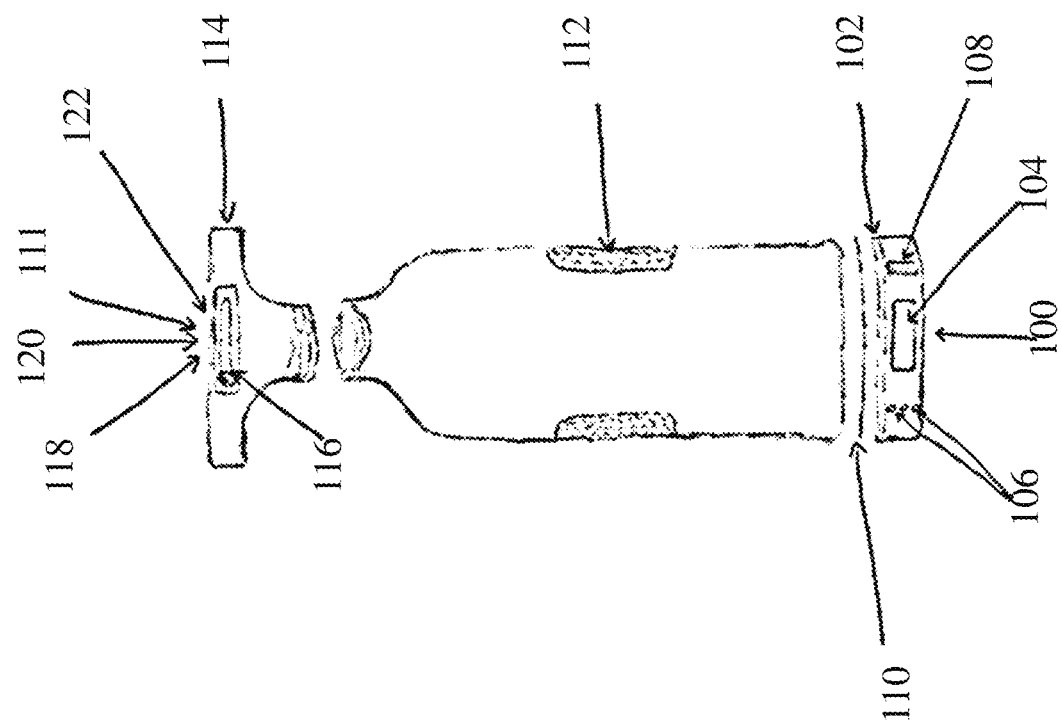
FIG. 1 is a frontal cutaway sheet showing an exemplary embodiment of an intelligent fluid bottle comprising
  a) an elongated hollow container for liquid, further comprising in some embodiments ergonomic grip handles, in some such embodiments one or more sensors, in some embodiments one or more LEDs, in some embodiments a scale, and/or in some embodiments a filter or housing for the retention and removal of a filter;
  b) a lid module which in some embodiments may be detachable, further comprising in some such embodiments a lever for opening and closing, in some embodiments a drinking spout cover in some embodiments, in some embodiments a contact detector, in some embodiments in some embodiments a motion sensor detector, in some embodiments a drinking spout, or any combination of the aforementioned;
  c) and a base module, further comprising a mechanism for transmitting power in some embodiments said power being supplied by one or more batteries, in other embodiments from an alternating current supply, in some embodiments a digital display, in some embodiments one or more LED lights, in some embodiments a water level indicator, in some embodiments a radiation shield, in some embodiments a scale, in some embodiments one or more sensors, and/or in some embodiments a wireless transmission mechanism.
Figure 2:
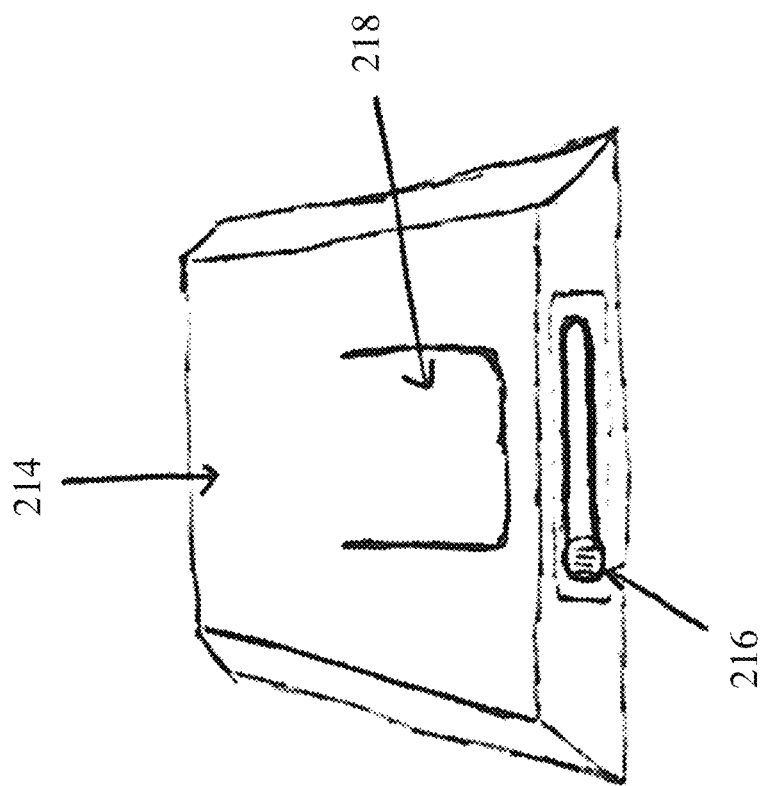
FIG. 2 is a frontal diagram of an exemplary embodiment of an intelligent bottle lid, in this case comprising an open/close lever, and a drinking spout cover (in this case in the closed position because the open/close lever is in the closed position).
Figure 3:
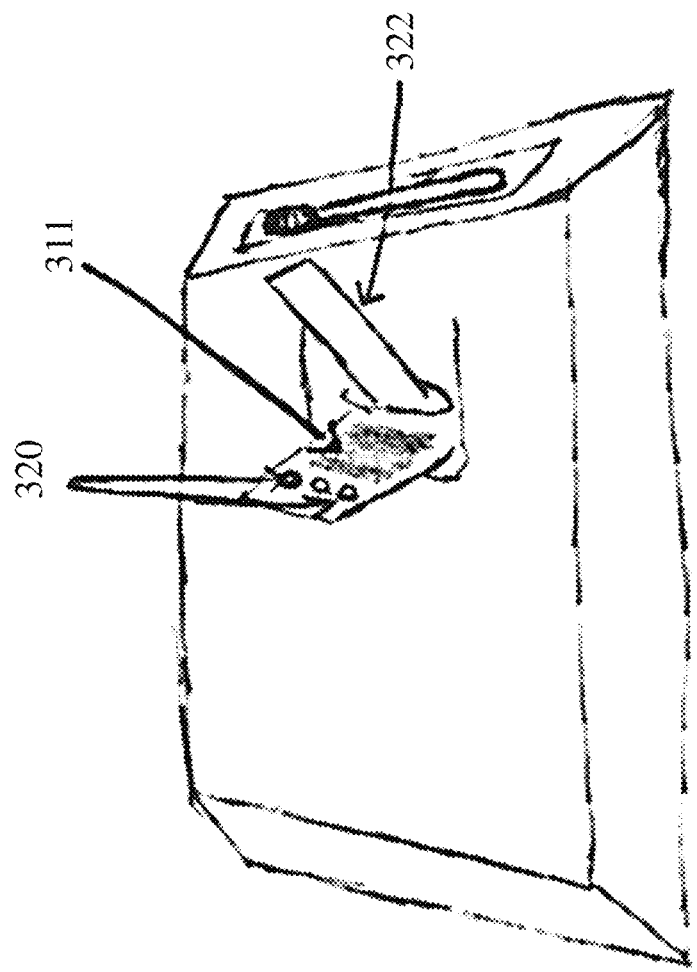
FIG. 3 is a side-view of an exemplary embodiment of an intelligent bottle lid, in this case comprising an open/close lever, and a drinking spout cover (in this case in the open position because the open/close lever is in the open position).
Figure 4:
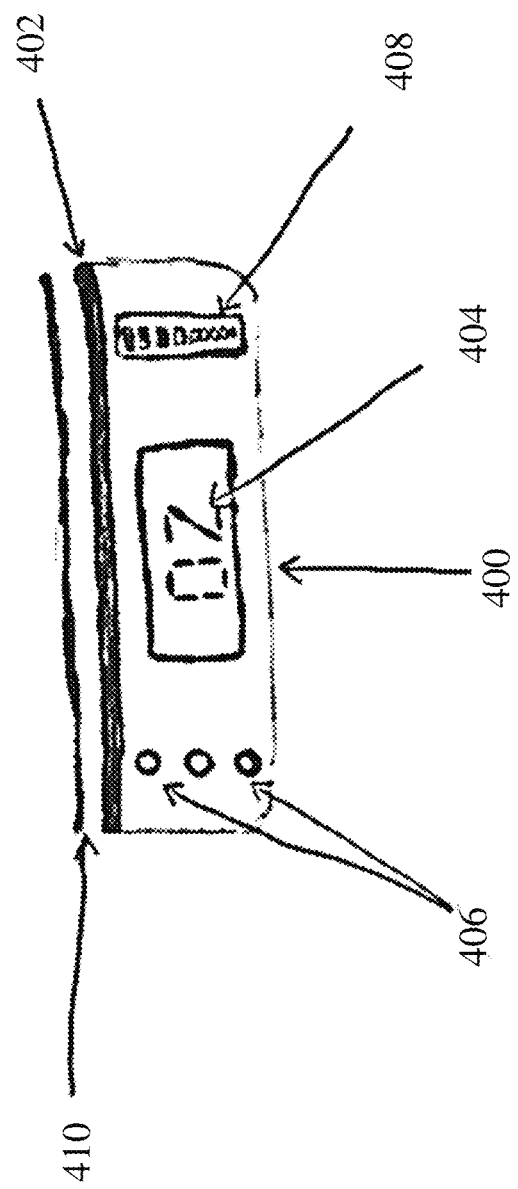
FIG. 4 is a front view of an exemplary embodiment of an intelligent bottle base module, in this case further comprising a smart scale, a digital display showing the weight of the liquid in the liquid container module, LEDs in this case labeled hydration traffic lights with the base light being similar to a green traffic light guiding the user to drink freely, the middle light being similar to a yellow traffic light indicating the user is currently hydrated and the top light being similar to a red traffic light indicating the user needs to stop hydrating due to the risk of over-hydration, a radiation shield protecting the fluid contained from potentially dangerous radiation, a water level indicator and blue tooth connectivity.

In this disclosure the terms 'Smart Bottle' and 'Intelligent Bottle' are used interchangeably to refer to any device which may be used for the storage and pouring of fluid, the detection of data related to said fluid by means including but not limited to a weight scale within, sensors, or probes housed within said device, which in some embodiments may be displayed on a screen on the face of the device or one of its components, or transmitted to another device for display such as a mobile phone application or laptop. In some exemplary embodiments of the disclosure the user may utilize a system including one or more of such devices to regulate or manipulate said fluid by means including but not limited to heating the fluid to a desired temperature, mixing the fluid with an imbedded impeller for filtration purposes, mixing the fluid using an imbedded impeller to help form a homogeneous mixture with one or more substances, using one or more colored lights to change the appearance of said fluid or it's housing device, sending a signal to magnetize the device or its base to attach it to metal surfaces by activating or completing a circuit to activate one or more embedded magnets in the device or a component of the device, or purifying the fluid housed within the device using ultraviolet light. In some exemplary embodiments, sensors may also be placed on the user to detect fluid intake needs, in some such embodiments transmissions being sent to the mobile application, the bottle or both displaying the percentage of fluid needed, and calculated comparison to the amount actively being drunk by the user. In other such embodiments data related to the temperature of the user, vs the temperature of fluid consumed may be transmitted. In yet other embodiments the type of fluid being consumed may be detected, including but not limited to the pH level, Dissolved Oxygen level, or sugar level and compared with data detected from the user including but not limited to dehydration level, blood/oxygen level, or blood/sugar level.

One feature shared by all embodiments of the disclosure is the display mechanism. The display mechanism may be as simple as means including but not limited to a screen on the face of the device which displays data related to the fluid content such as temperature or weight. In some embodiments, the device may be charged by means including but not limited to plugging the device directly into an outlet, in others it may be tethered by means including but not limited to a lightning cable, USB, or plug to an outlet, battery or charged device, or placing it on a charging pad, the device comprising a rechargeable battery compatible with said means in some such embodiments. In some embodiments, the disclosed device may include a motion sensor and/or a motion response mechanism allowing the device to autonomously react to motion as a user approaches or attempts to grab the device. In some such embodiments, the device may include an adjustable ultraviolet light which may allow the device to adjust the amount of ultraviolet or visible light emitted, allowing the user to see and/or to neutralize bacteria harmed by ultraviolet radiation. In some such embodiments the display may be embedded in a removable face plate which is interchangeable with other face plates in some such embodiments to add color, ergonomic grip handles, a display with different firmware and capabilities or a faceplate with a mechanical display vs a digital one, comprising a mechanical timer, sight glass, physical thermometer as opposed to transmitting signals involving an embedded thermistor or some other mechanical component. In other such embodiments the display may be a GUI for a cell phone receiving signals transmitted directly from the device or from a Server comprising a database where data related to the smart bottle is stored. In yet other embodiments of the disclosure the device may include interchangeable bases or lids with one or more of the aforementioned features being housed. In some such embodiments the base may be charged separately from the device while liquid may still be housed in the device. In other such embodiments the base may rely on battery power. In yet other such embodiments the base may include a retractable plug for wired charging.

In some exemplary embodiments of the disclosure the apparatus may comprise a smart scale/tracker base 100 which in some embodiments may have wireless connectivity, but can be used to weigh the fluid the bottle contains, using a scale 102. The weight of the fluid contained may be displayed on a digital display window 104, with additional guidance for the user displayed on "hydration tracker lights" 106 which display data related to information the user inputs into an app, predefined data or data detected from the user, with the hydration lights helping to guide the user to drink, slow down or stop drinking in some such embodiments being displayed as a green light, yellow light or red light respectively. In some exemplary embodiments a water level indicator 108 may be included to dim progressively as the amount of water in the bottle decreases. In some exemplary embodiments a "radiation shield" 110 may be included in the base of the device, serving as a barrier between the base and body of the bottle, protecting the user from potentially harmful radiation contaminating the fluid. In other such embodiments said "radiation shield" 111 may be included in the lid/spout cover of the bottle serving as a barrier between the contact/motion detection sensor and the drinking spout protecting the user from potentially harmful radiation. In some exemplary embodiments ergonomic handles 112 may be incorporated into the body of the device for a user-friendly body/grip design, in some such embodiments the device being designed to fit into any standard universal cupholder with added textured bottle-waistband grip providing a convenient non-slip feature for easy handling. On some exemplary embodiments the bottle lid or top 114 may further comprise smart technology for the detection of water consumption, the drinking spout, drinking spout cover, and/or an open/close lever 116 designed with a swipe right (open) swipe left (close) method in the displayed embodiment of FIG. 1. In some such exemplary embodiments a "drinking spout cover" 118 can serve as protection for the user from unwanted germs around the drinking spout, which opens and closes when activated by open/close lever, and in some such embodiments houses the contact/motion detection sensor and radiation shield. In some exemplary embodiments a "contact/motion detection sensor" 120 may be housed underneath (behind) the drinking spout cover to detect motion between the sensor and drinking spout. When water is released after motion is detected (while lid is screwed closed), the water will be calculated as intake for the user. When water is released with no motion detected (or the lid unscrewed open), the water will not be factored as intake. In several exemplary embodiments a "drinking spout" 122 may be comprised within the lid, and serves as the conduit for the user to directly access water deposited into the bottle and provides immediate transfer from bottle to user's body for optimal hydration.

In some other exemplary embodiments of the disclosure the apparatus may comprise a lid 214 further comprising an open/close lever 216 which operates a drinking spout cover 218 that serves as protection for the user from unwanted germs around drinking spout, opens and closes when activated by the open/close lever, and in some embodiments house the contact/motion detection sensor and radiation shield.

In yet other exemplary embodiments of the disclosure the lid cover may further comprise a radiation shield (lid/spout cover) 311, which serves as a barrier between the contact/motion detection sensor and the drinking spout protecting the user from any potentially harmful radiation. Such exemplary embodiments may further comprise a contact/motion detection sensor 320 which is housed underneath (behind) the drinking spout cover to detect motion between the sensor and drinking spout. In some such embodiments when water is released after motion is detected (while lid is screwed closed), the water will be calculated as intake for the user. In some such embodiments when water is released with no motion detected (or the lid unscrewed open), the water will not be factored as intake. Such exemplary embodiments may also further comprise a drinking spout 322 which serves as the conduit for the user to directly access water deposited into the bottle and provides immediate transfer from bottle to user's body for optimal hydration.

In some exemplary embodiments of the disclosure the device may comprise a smart scale/tracker base with wireless connectivity 400 which may weigh the weight of fluid using a scale 402 which weighs the fluid deposited into the bottle (in the displayed embodiment the weight being provided in ounces on a digital display window 404). In some such embodiments the base may communicate with an app when water consumption is detected. In order to calculate the amount consumed the amount detected may be subtracted from the bottle and added to the user's personal tracker in the app. In some embodiments the base will also indicate the level of water remaining in the bottle, and in some such embodiments may use hydration indicators encouraging best times to drink based on information input by the user. These hydration indicators may be in the form of Hydration Traffic Lights 406 as displayed in the example where similar to red, yellow, and green traffic lights, colored LEDs may be used based upon user information input into the app, to help guide the user along their daily hydration journey where in some embodiments green may signify drinking free, yellow warning users to slow down as a user is currently hydrated, and red encouraging a user to stop drinking, user is at risk of over-hydrating. In some such embodiments as shown in the drawing the base may further comprise a Water Level Indicator 408 which may include a column of colored lights, bar or other display indicating the water level in bottle from full to empty. In some such embodiments lights may appear, disappear, brighten or darken as the amount of water in the bottle decreases or increases. In some embodiments the base may further comprise a Radiation Shield (Base) 410 which serves as a barrier between the base and body of the bottle protecting the user from any potentially harmful radiation affecting the quality of the user's water.

Figure 5:
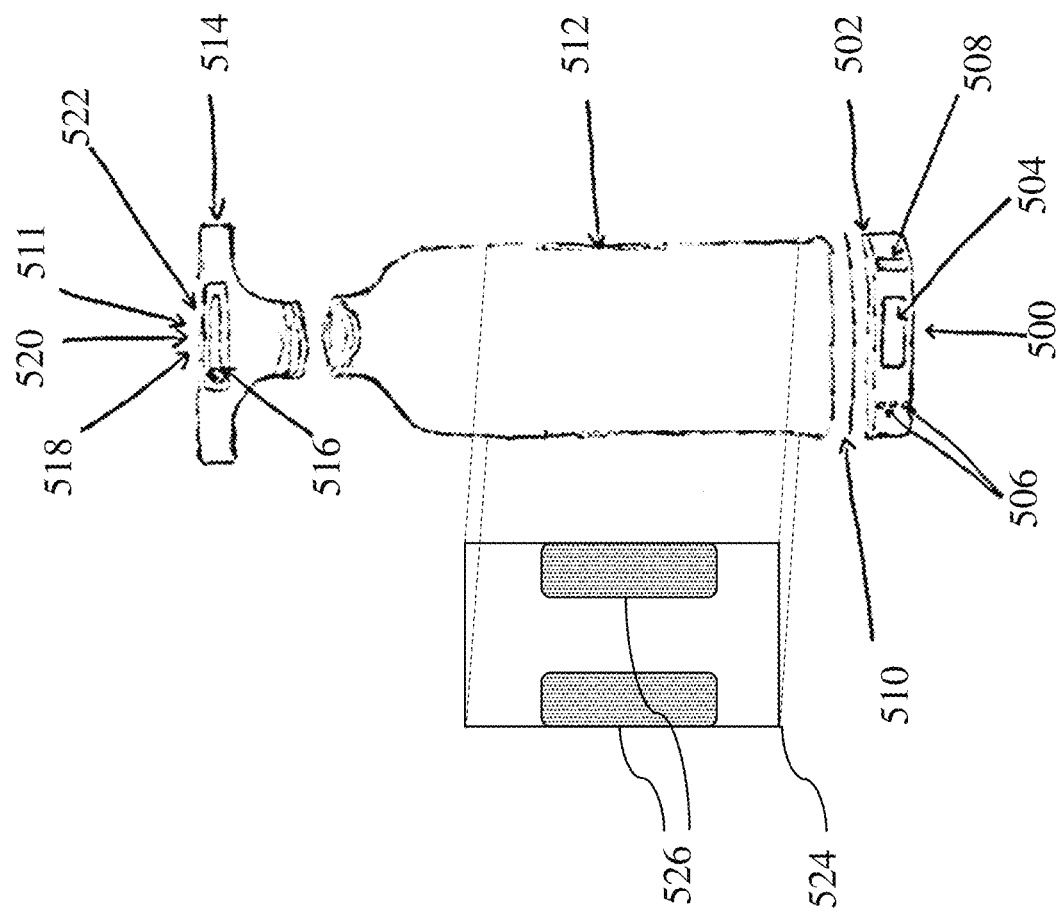
FIG. 5 is a frontal cutaway sheet showing an exemplary embodiment of an intelligent fluid bottle as in FIG. 1, further comprising a detachable face panel, in this exemplary embodiment further comprising colored ergonomic gripping handles.

FIG. 5 displays a bottle with a smart scale/tracker base 500 which may weigh the fluid the bottle contains, using a scale 502, showing a value on a digital display window 504, with additional guidance for the user displayed on "hydration tracker lights" 506 a water level indicator 508 a "radiation shield" 510 may be included in the base of the device, or in the lid/spout as a lid "radiation shield" 511 may be included in the lid/spout cover of the bottle serving as a barrier between the contact/motion detection sensor and the drinking spout protecting the user from potentially harmful radiation. The bottle lid or top 514 may further comprise smart technology for the detection of an open/close lever 516 designed with a swipe right (open) swipe left (close) method in the displayed embodiment of FIG. 1. In some such exemplary embodiments a "drinking spout cover" 518 can serve as protection for the user from unwanted germs around the drinking spout, a "contact/motion detection sensor" 520 may be housed underneath (behind) the drinking spout cover to detect motion between the sensor and drinking spout 522, which may be comprised within the lid, and serves as the conduit for the user to directly access water deposited into the bottle. In the exemplary embodiment a detachable faceplate 524 allows the ergonomic grip handles 526 to be attached and removed repeatedly from the face 512 of the bottle. In other such embodiments the faceplate may be exchanged for another with features including but not limited to an external thermometer, touch screen display, temperature regulator or different color faceplate.

Figure 6:
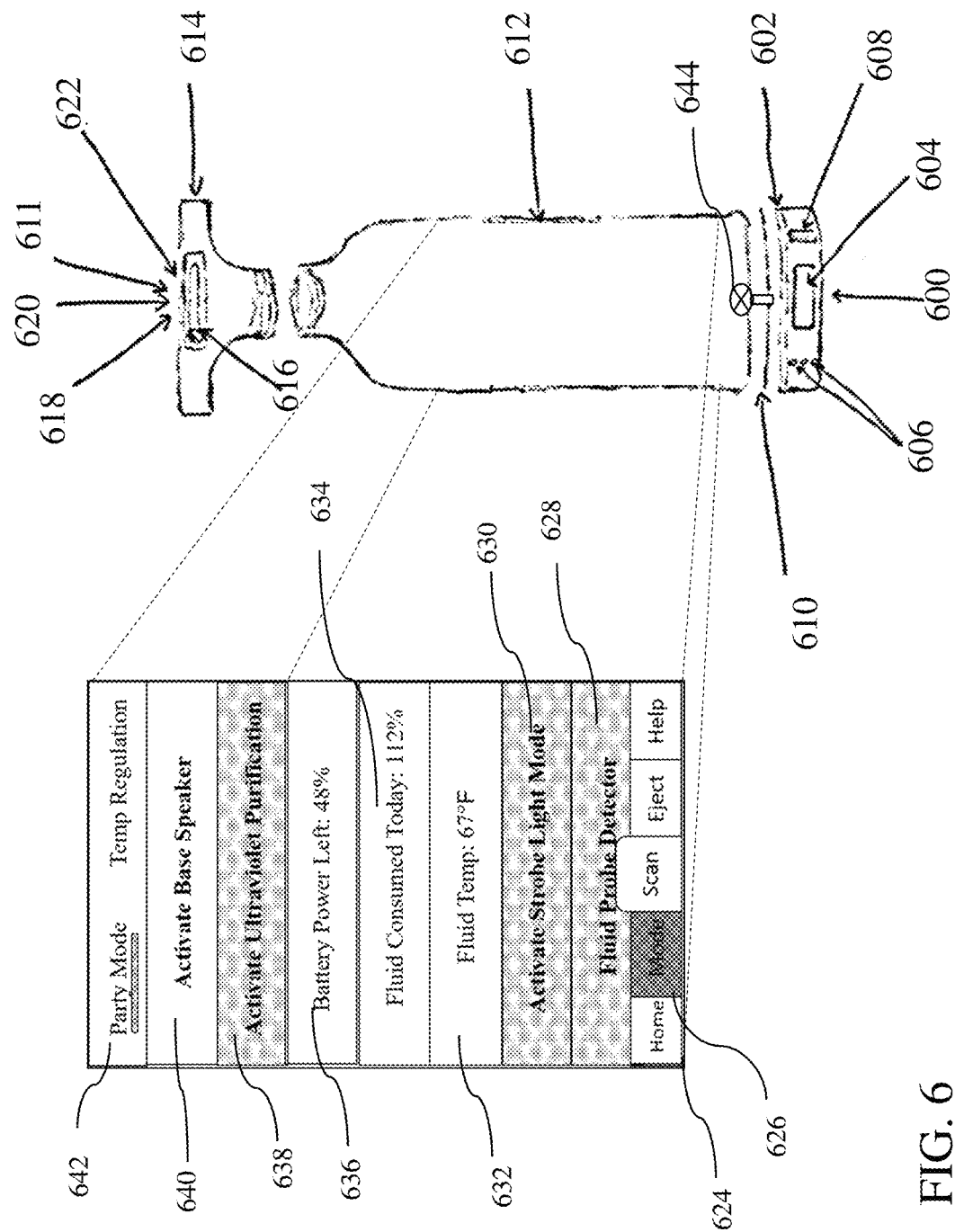
FIG. 6 is a frontal cutaway sheet showing an exemplary embodiment of an intelligent fluid bottle as in FIG. 1, further comprising a detachable face panel, in this exemplary embodiment further comprising an electronic touchpad to operate the control and monitoring of said intelligent fluid bottle.

FIG. 6 displays a bottle with a smart scale/tracker base 600 which may weigh the fluid the bottle contains, using a scale 602, showing a value on a digital display window 604, with additional guidance for the user displayed on "hydration tracker lights" 606 a water level indicator 608 a "radiation shield" 610 may be included in the base of the device, or in the lid/spout as a lid "radiation shield" 611 may be included in the lid/spout cover of the bottle serving as a barrier between the contact/motion detection sensor and the drinking spout protecting the user from potentially harmful radiation. The bottle lid or top 614 may further comprise smart technology for the detection o an open/close lever 616 designed with a swipe right (open) swipe left (close) method in the displayed embodiment of FIG. 1. In some such exemplary embodiments a "drinking spout cover" 618 can serve as protection for the user from unwanted germs around the drinking spout, a "contact/motion detection sensor" 620 may be housed underneath (behind) the drinking spout cover to detect motion between the sensor and drinking spout 622 which may be comprised within the lid, and serves as the conduit for the user to directly access water deposited into the bottle. In the exemplary embodiment a detachable faceplate 624 allows an electronic control pad, in this case with a number of modes 626 controlling and displaying data regarding a great number of features including but not limited to the fluid temperature 632, measuring the fluid consumed 634, the battery power left 636 or allowing a user to activate a speaker in the base 640, while a number of features for which the sensors or attachments haven't been installed yet are also shown including but not limited to a fluid probe detector 628, strobe light 630, and ultraviolet purifier 632. These may be attached and removed repeatedly from the face 612 of the bottle. In other such embodiments the digital faceplate may come with the bottle and not be removable. A mixer 644 is also shown in the base of the bottle in this exemplary embodiment.

Figure 7A:
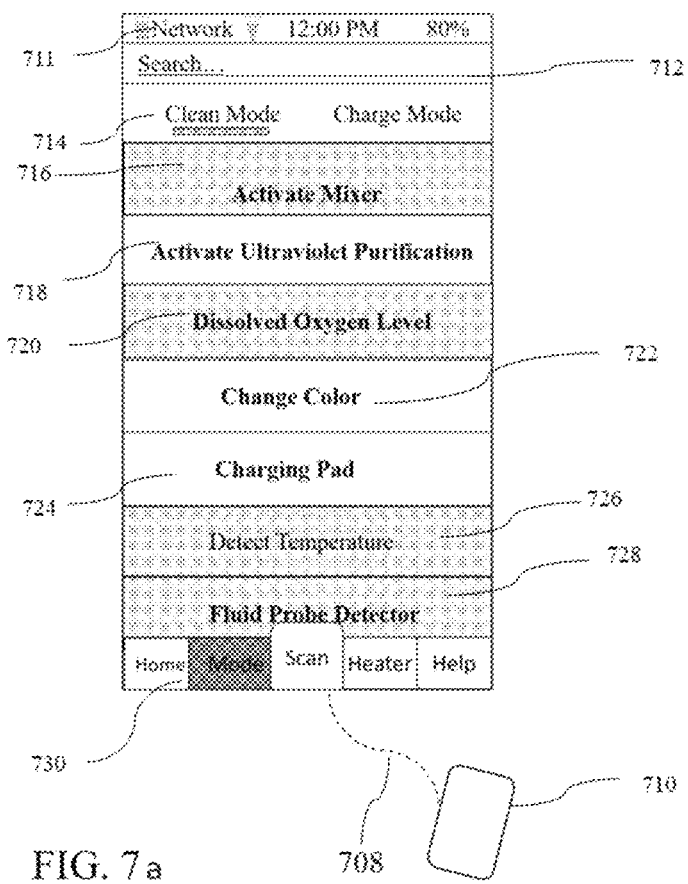
FIG. 7 is an exemplary embodiment of an intelligent fluid bottle wherein it and an associated charging pad are controlled remotely by a mobile device operated application.
Figure 7B:
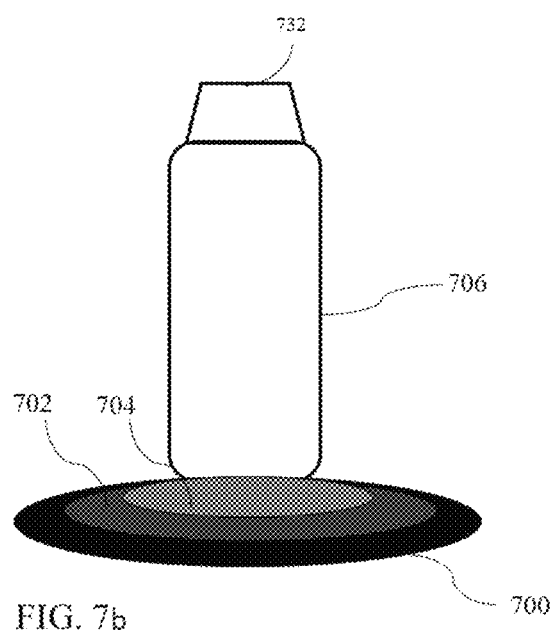

FIG. 7 displays a charging base 700 comprising concentric components 702, and 704, which may have features including but not limited to the ability to clean, weigh or warm a bottle 706 which transmits data 708 to and from a device 710 running an application 711 which may include a search function 712, with the option to select from modes including but not limited to a charging mode or a cleaning mode 714 in which features including but not limited to activating an ultraviolet purification light 718 changing the color emitted by a color changing illumination device within or under the bottle 722 or on the charging pad 724 can be activated. In this exemplary embodiment features for which components have not been installed including but not limited to the ability to activate a motor 716, checking the dissolved oxygen level 720 detecting the temperature 726 or detecting the type of fluid using a fluid probe detector 728 are grayed out because they are not available until their respective modules are installed. Other features may be selected under the mode 730 menu such as the ability to remotely open a lid 732 to release steam or begin to otherwise cool a bottle as needed, remotely close a lid, match the adjust according to the detected ambient temperature or inject a CO2 pack.

Figure 8:
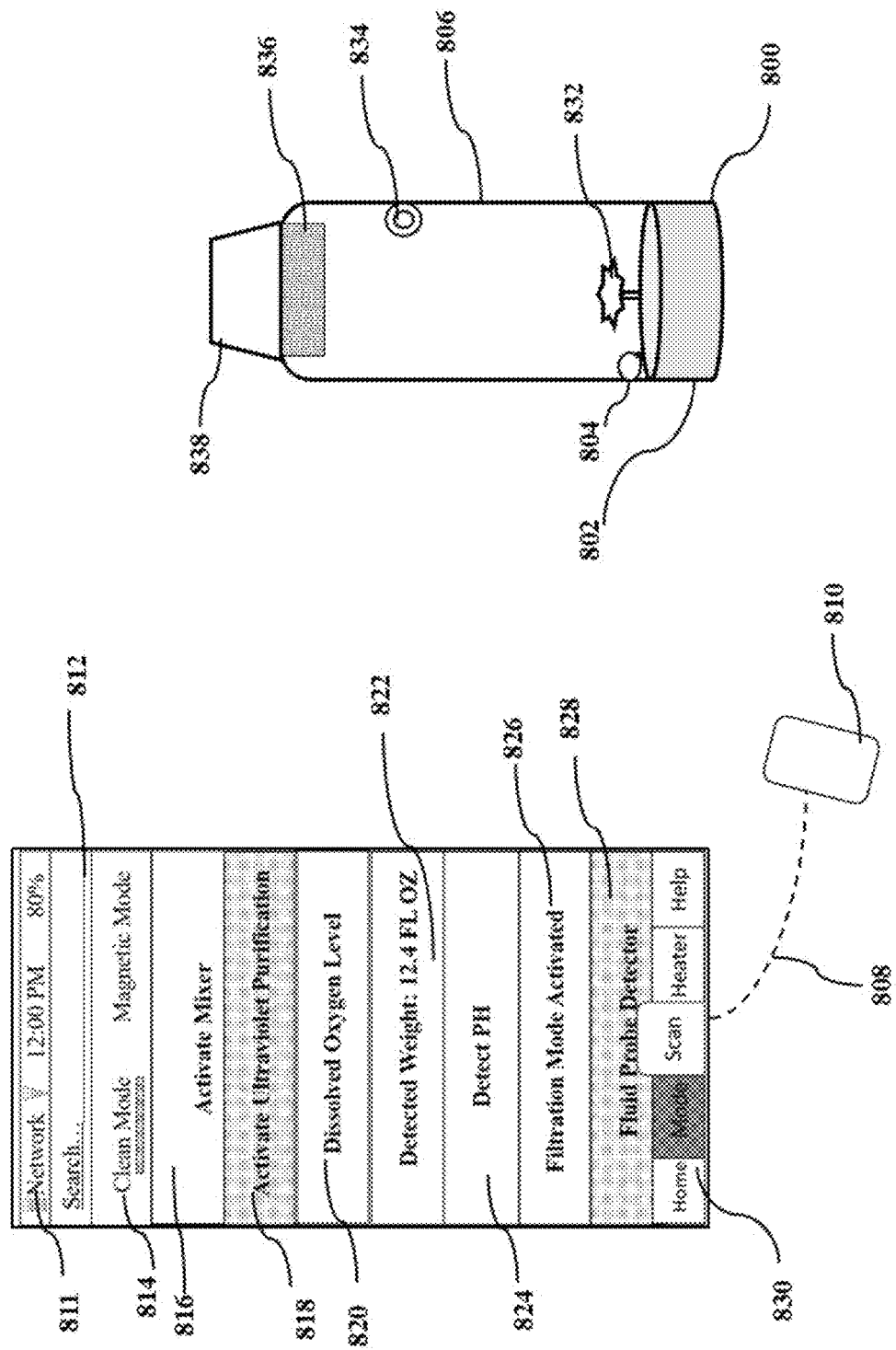
FIG. 8 is an exemplary embodiment of an intelligent fluid bottle wherein it and a detachable base, sensors, and various components are controlled remotely by a mobile device operated application.

FIG. 8 displays bottle 800 comprising a base 802, pH sensor 804, in a fluid container section 806 which transmits data 808 to and from a device 810 running an application 811 which may include a search function 812, with the option to select from modes including but not limited to a magnetic mode or a cleaning mode 814 in which features including but not limited to activating a mixer 816 the selection of which may cause an impeller 832 in the lower section of the fluid containing chamber to spin, detecting the dissolved oxygen level 820 or weight 822 or pH 822. A filtration mode can be activated 826 causing the fluid contained therein to be pumped, sucked or cycled through a filtration chamber 836 to help collect and remove impurities before being fed through the lid section 838. In this exemplary embodiment features for which components have not been installed including but not limited to the ability to activate ultraviolet purification 818 or detecting the type of fluid using a fluid probe detector 828 are grayed out because they are not available until their respective modules are installed. Other features may be selected under the mode 830 menu such as the ability to remotely open a lid 832 magnetize or demagnetize the base of the bottle or eject the liquid containing chamber from the base.

Figure 9:
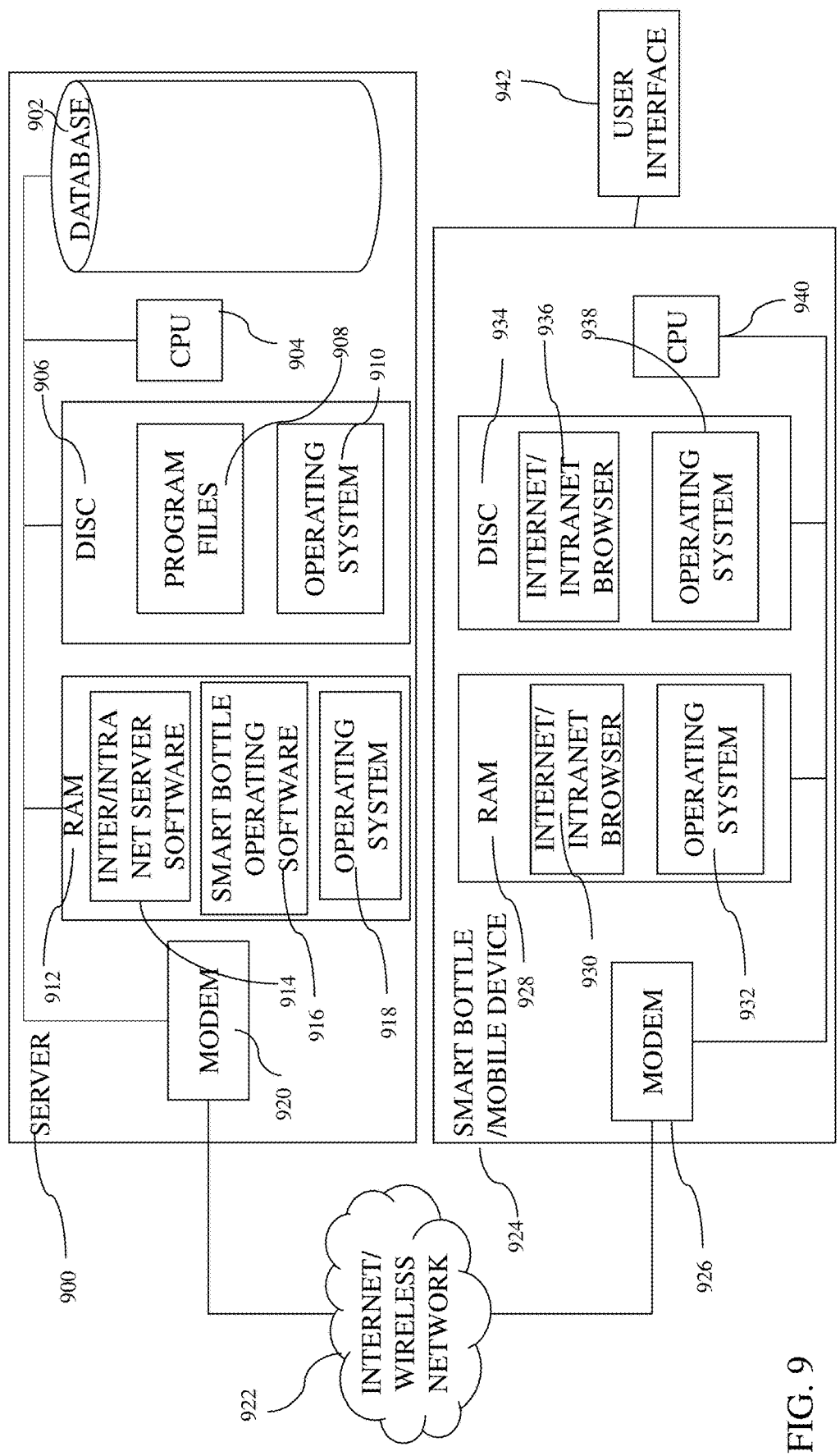
FIG. 9 is an exemplary flowchart showing the typical database hierarchy with data sent to and from a device including but not limited to a charging station, water bottle, monitoring sensors for fluid, monitoring sensors placed on the user, or a mobile device using an application which may process a variety of functions including but not limited to vocal commands, language translation, responses, ordering of replacement parts, operating the device, or letting a user know how well they or any family members in their home network database or in competition with them on a cloud database are performing functions including but not limited to consuming fluid or regulating the fluid they consume.

FIG. 9 is an exemplary embodiment following a standard Internet architecture in which one or more user's smart bottle/mobile device 924 and a server 900 are connected via the internet/wireless network 922 and modems 926, 920 or other communications channels. A user accesses the server 900 via their smart bottle/mobile device 924 potentially via verbal commands operating a web browser 930 or other software application residing in RAM memory 908 that allows it to display information downloaded from a server 900. The server system 900 runs server software 914, including the smart bottle operating software 916 of the present invention, which interacts with the smart bottle/mobile device 924 and a user information database 902. The database 902 contains data regarding the contents bottle collected via sensors, data regarding the room around the body collected by sensors, data regarding the users collected by sensors on the user, data from the users collected by user input, prerecorded data or some combination therein. The smart bottle operating software 916 in some situations will process a user's verbal commands by acting in means including but not limited to pulling information from the database 902 adding information to it, sending information back to the device such it can respond verbally to the user in language they will understand. Both the server 900 and the smart bottle/mobile device 924 include respective storage devices, such as hard disks 906 and 934 and operate under the control of operating systems 918, 932 executed in RAM 912, 928 by the CPUs 904, 940. The server storage device 906 stores program files 908 and the operating system 938. Similarly, the user storage devices 934 store the inter/intranet browser software 936 and the operating systems 938. Typically, the user would utilize the user interface 942 on their mobile device 924 but in some such embodiments it may be on the smart bottle itself 924. In some such exemplary embodiments this system may involve an application which may process a variety of functions including but not limited to vocal commands, language translation, responses, ordering of replacement parts, scheduling filter changes, or letting a user know how well they or any family members in their home network database or in competition with them on a cloud database are performing functions including but not limited to fluid consumption or other health related data.

Figure 10:
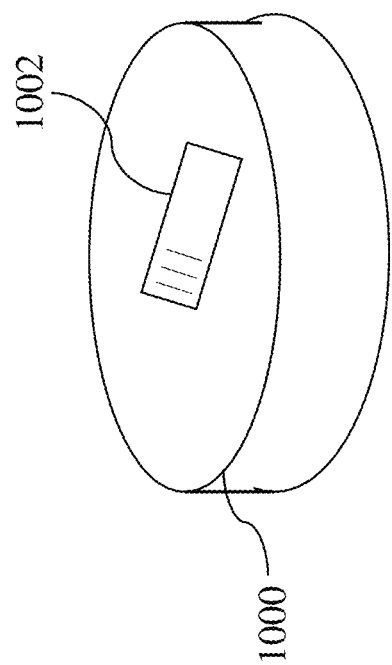
FIG. 10 is an orthogonal view of a base module with a retractable door for insertion of and removal of batteries.

FIG. 10 is an upside-down view of displays bottle base 1000 comprising a removable battery tray 1002.

Some embodiments of the present disclosure may involve apparatuses, methods, or systems for smart bottles including but not limited to: detecting data from the surrounding environment by including a thermistor to take the ambient temperature, a barometer to measure ambient pressure or a gyroscope to measure the bottle's orientation; detecting data from within the bottle by including a thermistor to take the fluid temperature within the bottle, pH sensor to measure the fluid's pH within the bottle or a scale to measure the weight of the fluid; performing a function on the fluid by including an impeller for mixing the fluid within the bottle, heater for warming the fluid within the bottle or forced suction filter for filtering the fluid from impurities within the bottle, or any combination therein or similar systems. Embodiments of the present disclosure also include the means for communicating between the bottle and an application which may be run from the bottle, from a remote mobile application or from other remote devices such as a laptop.

Some Preferred Embodiments of the Present Disclosure are Described as Follows:

1. A container for liquid comprising:
    an elongated hollow chamber comprising a base, sidewalls, and an open top with grooves around the sidewall perimeter;
    a removable top lid comprising grooves along an inner sidewall; and
    a base chamber comprising components capable of transmitting energy from a power source.

2. The apparatus of claim 1 further comprising a rechargeable battery in said base chamber.
3. The apparatus of claim 1 further comprising a battery receiving portion having a battery chamber for receiving a battery, a battery chamber opening being formed at least partly in one of said side and back surfaces and in communication with said battery chamber, wherein said battery chamber opening is shaped to substantially conform to a longitudinal cross-section of the battery.
4. The apparatus of claim 1 further comprising a digital display on the outer face of the sidewall of said elongated hollow chamber.
5. The apparatus of claim 1 further comprising a digital display on the outer face of the sidewall of said base chamber.
6. The apparatus of claim 1 further comprising a wireless transmitter housed within said base chamber.
7. The apparatus of claim 1 further comprising a wireless transmitter housed within said elongated hollow chamber.
8. The apparatus of claim 1 wherein said base chamber further comprises grooves along an upper inner sidewall, fitting with a grooved outer sidewall extruding from the base of said elongated hollow chamber, such that said base chamber is removable and interchangeable.
9. The apparatus of claim 8 wherein said grooved outer sidewall comprises circuitry complimentary to circuitry along said grooved inner sidewall such that a circuit is completed and power transmitted from said base chamber to said elongated hollow chamber when the two chambers are connected.
10. The apparatus of claim 8 wherein said removable base chamber further comprises a thermistor.
11. The apparatus of claim 8 wherein said removable base chamber further comprises a heater.
12. The apparatus of claim 8 wherein said removable base chamber further comprises a scale.
13. The apparatus of claim 8 wherein said removable base chamber further comprises a colored light emitting diode.
14. A method of creating an intelligent bottle involving:
creating interchangeable modular sections
wherein a primary module is used for the transport and consumption of fluid
a secondary module can transmit power when joined with the primary module
the power transmitted to the primary module can power a number of functions.
15. The method of creating an intelligent bottle of claim 14 wherein:
the powered functions are housed within the primary module.
or
b) the powered functions are housed within a secondary module
16. A system of an intelligent bottle comprising a bottle with sensors transmitting data regarding stored fluid wirelessly to a computing device application, wherein the mobile device and a server are connected via a wireless network and modems, the mobile device is capable of receiving verbal commands operating a web browser or other software application residing in ram memory that allows it to display information downloaded from a server, the server system runs server software, including the smart bottle operating software, which interacts with sensors a mobile device and a user information database, the database contains data regarding the contents bottle collected via the sensors, data regarding the room around the body collected by sensors, data regarding the users collected by sensors on the user, data from the users collected by user input, prerecorded data or some combination therein, the smart bottle operating software in some situations will process a user's verbal commands by acting in means including but not limited to pulling information from the database, adding information to it, sending information back to the device such it can respond verbally to the user in language they will understand, both the server and the bottle include respective storage devices, such as hard disks and operate under the control of operating systems executed in ram by the cpus, the server storage device stores program files and the operating system and the inter/intranet browser software and browser operating systems.
17. The system of claim 16 wherein said computing device application is capable of transmitting commands operating one or more attachments within said bottle, said sensors sending a signal for the attachments to adjust by responding to detected readings reaching one or more predefined limits.
18. The system of claim 16 wherein said computing device application is capable of transmitting commands operating one or more attachments within said bottle, said sensors sending a signal for the attachments to adjust by responding to detected readings reaching one or more user-defined limits.
19. The system of claim 17 wherein the mobile device a display built into the smart bottle itself.
20. The system of claim 19 wherein said smart bottle further comprises an application which may process a variety of functions including but not limited to vocal commands, language translation, responses, ordering of replacement parts, scheduling filter changes, or letting a user know how well they or any family members in their home network database or in competition with them on a cloud database are performing functions including but not limited to fluid consumption or other health related data.

It is understood that the various preferred embodiments are shown and described above to illustrate different possible features of the invention and the varying ways in which these features may be combined. Apart from combining the different features of the above embodiments in varying ways, other modifications are also considered to be within the scope of the invention.

The invention is not intended to be limited to the preferred embodiments described above, but rather is intended to be limited only by the claims set out below. Thus, the invention encompasses all alternate embodiments that fall literally or equivalently within the scope of these claims.

Having thus described my invention, I claim:
1. A container for liquid comprising:
an elongated hollow chamber comprising a base, sidewalls, and an open top with grooves around the sidewall perimeter;
a removable top lid comprising grooves along an inner sidewall;
a detachable faceplate;
a base chamber comprising components capable of transmitting energy from a power source;
a mixer;
one or more magnets;
an ultraviolet light;

a pH sensor; and a wireless transmitter which transmits data to and from a device running an application which includes a search function with the option to select from modes including a magnetic mode and cleaning mode, features including activating said ultraviolet light and activating said mixer.

2. The apparatus of claim 1 further comprising a rechargeable battery in said base chamber.

3. The apparatus of claim 1 further comprising a removable battery tray, wherein said battery tray comprises one or more sensors, measuring the battery power left and communicating the battery power left to said detachable faceplate.

4. The apparatus of claim 3 further comprising a digital display on the detachable faceplate.

5. The apparatus of claim 4 wherein the wireless transmitter housed within said base chamber.

6. The apparatus of claim 4 wherein the wireless transmitter housed within said elongated hollow chamber.

7. The apparatus of claim 1 further comprising a digital display on the detachable faceplate.

8. The apparatus of claim 1 wherein said base chamber further comprises grooves along an upper inner sidewall, fitting with a grooved outer sidewall extruding from the base of said elongated hollow chamber, such that said base chamber is removable and interchangeable.

9. The apparatus of claim 8 wherein said grooved outer sidewall comprises circuitry complimentary to circuitry along said grooved inner sidewall such that a circuit is completed and power transmitted from said base chamber to said elongated hollow chamber when the two chambers are connected.

10. The apparatus of claim 8 wherein said removable base chamber further comprises a thermistor.

11. The apparatus of claim 8 wherein said removable base chamber further comprises a heater.

12. The apparatus of claim 8 wherein said removable base chamber further comprises a scale.

13. The apparatus of claim 8 wherein said removable base chamber further comprises a colored light emitting diode.

* * * * *